(12) United States Patent
Hinque et al.

(10) Patent No.: US 9,340,077 B2
(45) Date of Patent: May 17, 2016

(54) AIR COMPRESSOR FOR A PNEUMATIC TIRE AND A TIRE COMPRISING A COMPRESSOR MOUNTED WITHIN THE TIRE'S CAVITY

(71) Applicant: The Goodyear Tire & Rubber Company, Akron, OH (US)

(72) Inventors: Daniel Paul Luc Marie Hinque, Habay-la-Neuve (BE); Edwin Deerenberg, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 361 days.

(21) Appl. No.: 14/100,177

(22) Filed: Dec. 9, 2013

(65) Prior Publication Data

US 2015/0158350 A1    Jun. 11, 2015

(51) Int. Cl.
*B60C 23/12* (2006.01)

(52) U.S. Cl.
CPC ......... *B60C 23/12* (2013.01); *Y10T 152/10495* (2015.01)

(58) Field of Classification Search
CPC ........ B60C 23/10; B60C 23/12; B60C 29/00; F04B 43/025
See application file for complete search history.

(56) References Cited

U.S. PATENT DOCUMENTS

| | | | | |
|---|---|---|---|---|
| 2,619,907 A * | 12/1952 | Paterson | ............... | F04B 43/025 417/488 |
| 5,472,032 A * | 12/1995 | Winston | ................ | B60C 23/004 152/415 |
| 9,242,518 B2 * | 1/2016 | Hinque | ................... | B60C 23/12 |
| 2011/0120611 A1 * | 5/2011 | Hansen | ................... | B60C 23/12 152/429 |
| 2012/0160386 A1 | 6/2012 | Hinque et al. | | |
| 2012/0241064 A1 | 9/2012 | Hinque et al. | | |
| 2014/0174619 A1 * | 6/2014 | Hinque | ................... | B60C 23/12 152/450 |
| 2015/0059950 A1 * | 3/2015 | Hinque | ................... | B60C 23/12 152/450 |
| 2015/0059951 A1 * | 3/2015 | Hinque | ................... | B60C 23/12 152/450 |

FOREIGN PATENT DOCUMENTS

| | | |
|---|---|---|
| EP | 0193452 | 9/1986 |
| EP | 0360427 | 3/1990 |
| FR | 2761748 | 10/1998 |

* cited by examiner

*Primary Examiner* — Kip T Kotter

(74) *Attorney, Agent, or Firm* — David L. King

(57) ABSTRACT

An air compressor mountable to a sidewall of an annular tire cavity, wherein the compressor comprises an air inlet for receiving air to be pumped into the tire cavity and an air outlet for releasing air into the tire cavity. Further, the compressor comprises a double membrane assembly having a first membrane and a second membrane arranged in parallel to the first membrane. A pressure compensation chamber is provided between the first membrane and the second membrane, the pressure compensation chamber being in fluid communication with the tire cavity. Further, an air compression chamber is arranged on a side of the second membrane opposite to the pressure compensation chamber, wherein the compression chamber is in fluid communication with the air inlet and the air outlet. Moreover, a tire comprises the aforementioned compressor.

21 Claims, 4 Drawing Sheets

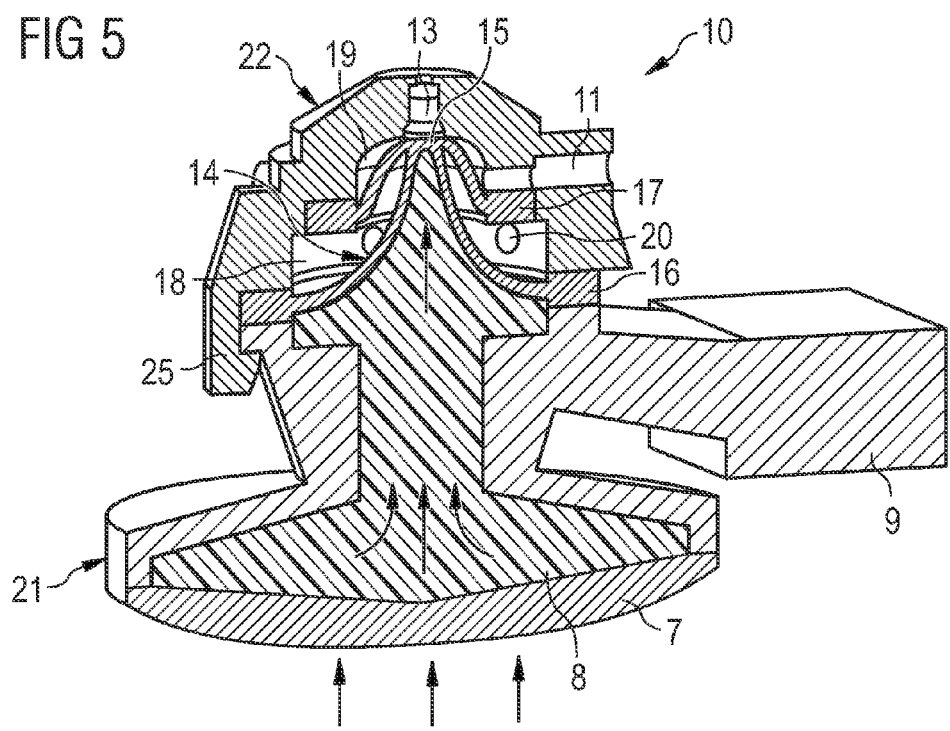
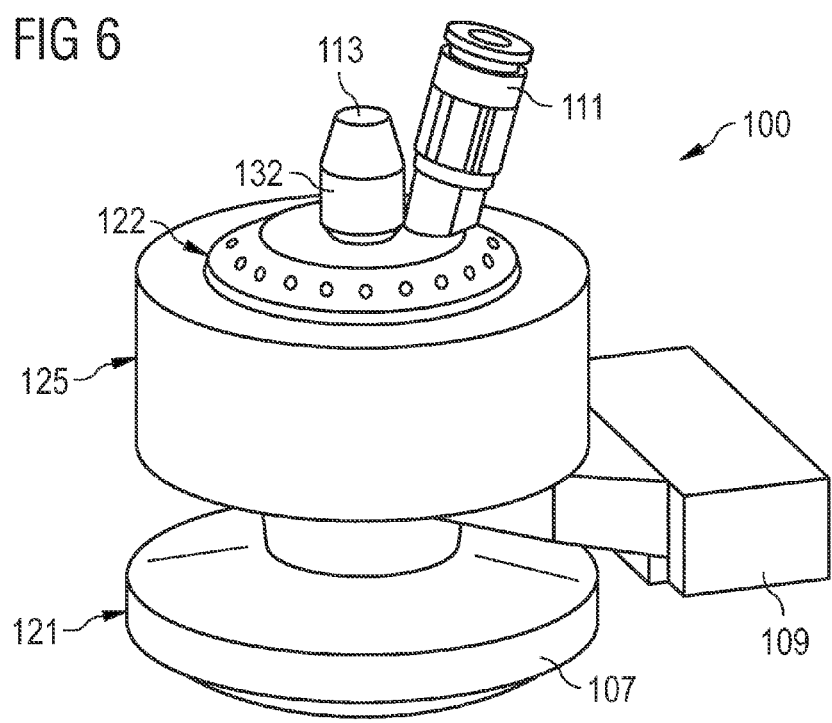

AIR COMPRESSOR FOR A PNEUMATIC TIRE AND A TIRE COMPRISING A COMPRESSOR MOUNTED WITHIN THE TIRE'S CAVITY

FIELD OF THE INVENTION

The invention generally relates to pneumatic tires and more specifically to a self-inflating tire having an integrated air compressor or air pump.

BACKGROUND OF THE INVENTION

Normal air diffusion reduces tire pressure over time so that the natural state of tires is underinflated. Accordingly, drivers should constantly check tire pressure to avoid increased fuel consumption or wear and to avoid impeded braking and/or handling performance. Even more, a substantially underinflated tire may constitute a severe safety risk. Tire pressure monitoring systems have been proposed to warn drivers when tire pressure is significantly low. Such systems, however, remain dependent upon the driver taking remedial action when warned to reinflate a tire to a recommended pressure.

It is preferable, therefore, to provide components which allow or help to provide an automatic inflation of a tire without requiring any action of the driver.

U.S. Patent Application 2012/0160386 A1 discloses a pump and actuator assembly for a self-inflating tire. The described tire system includes a compression actuator assembly mounted to a tire carcass for compressing air for delivery to a tire cavity. The compression actuator assembly includes a hollow cylindrical containment body formed from a resilient deformable material composition and containing a quantity of non-compressible fluid medium. The containment body is affixed to a relatively high flex-deformation region of the tire carcass and reciprocally transforms between a deformed state and a non-deformed state responsive to the deformation and recovery of the tire high flex deformation region in a rolling tire. Accordingly, the containment body in the deformed state displaces a pressurized quantity of the non-compressible medium which generates a compression force for application to a volume of air delivered to the tire cavity. A pump assembly is affixed to the tire carcass and includes valves for reciprocally opening and closing the inlet opening and the outlet opening of a compressor body synchronously with the cyclic transformation of the containment body.

US 2012/0241064 A1 discloses an air-maintenance tire system having a compression actuator mounted to the tire carcass and configured for operative actuation by tire deformation during a tire revolution. The system further comprises a pump assembly affixed to the tire carcass and including a compressor body affixed to the compression actuator and having an internal air chamber, wherein the air chamber has an inlet opening for admitting air into the internal air chamber and an outlet opening for conducting air from the internal air chamber to the tire cavity. The air compressor body further includes a deformable membrane valve member and an outlet valve member located within and at opposite respective ends of the internal air chamber. Furthermore, the compression actuator includes a hollow containment body formed from a resilient deformable material composition and containing a quantity of a non-compressible medium. The containment body is affixed to a relatively high flex-deformation region of the tire carcass and reciprocally transforms between a deformed state and a non-deformed state to generate a deformation force against a membrane valve member surface and deform the membrane valve between the open and closed positions within the air chamber.

SUMMARY OF THE INVENTION

In a first aspect, the present invention relates to a compressor mountable to a sidewall of an annular tire cavity, wherein the compressor comprises an air inlet for receiving air to be pumped into the tire cavity and an air outlet for releasing air into the tire cavity. Further, the compressor comprises a double membrane having a first membrane and a second membrane arranged in parallel to the first membrane. Still in accordance with the first aspect, the compressor has a pressure compensation chamber between the first membrane and the second membrane, the pressure compensation chamber being in fluid communication with the tire cavity. Further, the compressor has a compression chamber arranged on a side of the second membrane opposite to the pressure compensation chamber, wherein the compression chamber is in fluid communication with the air inlet and the air outlet.

The compressor according to the present invention provides a compact design which may be used to inflate a tire upon connection to an air inlet providing air to the compressor inlet.

The pressure compensation chamber results in the technical effect of providing tire cavity pressure to the sides of the first and the second membrane facing the pressure compensation chamber. Further, also the second side of the first membrane is subject to the tire cavity pressure as for example via a hydraulic fluid contained in a reservoir or bag which is also subject to tire cavity pressure. Thus, the function of the system is not impeded by tire cavity pressure. In particular, the second membrane may be held in the intake state via a link between the first and second membrane.

Upon cyclical, periodical or reciprocal deformation of the first membrane, as for example by hydraulic pressure, the first membrane and thus also the second membrane may reciprocate and may thus pump air via the compression chamber and the outlet into the tire. In other words, the second membrane may act like a piston in the compression chamber.

According to an aspect, the first membrane has a first central portion and the second membrane has a second central portion, wherein the first central portion is attached to the second central portion. This connection between both membranes may further improve the stability of the double membrane system. Further, on the one hand, the connection avoids a collapse of the second membrane into the compression chamber because of tire cavity pressure. On the other hand, the second membrane may be pushed into the compression chamber via the connection in order to compress the air.

According to another aspect, the first membrane is attached to the second membrane by a linking element, the linking element may extend essentially perpendicularly to the first membrane and the second membrane through the pressure compensation chamber. In other words, the first and the second membrane may have planar shapes and the linking element or connector may extend perpendicularly to these planar shapes.

In accordance with another aspect, the first membrane, the second membrane and the linking element are an integrally formed member. In other words, the double membrane may be a single piece member.

In accordance with yet another aspect, the double membrane assembly is made of or comprises rubber or silicone. In general, the membrane may be flexible and/or may deform reversibly.

In accordance with yet another aspect, the first membrane and the second membrane have each an essentially circular and/or planar shape.

In accordance with another aspect, the second membrane is arranged in a spaced relationship above or relative to the first membrane.

In accordance with another aspect, the first membrane and the second membrane define each a wall of the pressure compensation chamber.

In accordance with another aspect, the compressor comprises a reversibly deformable reservoir for containing a hydraulic fluid. The first membrane may be in hydraulic fluid communication with the deformable reservoir such that upon actuation of the first membrane via hydraulic fluid pressure, the first membrane exerts a force on the second membrane and presses the second membrane into the air compression chamber (by pressing the first membrane into the pressure compensation chamber). Providing the compressor with an integrated reversibly deformable reservoir, results in a self-contained and/or compact system for pumping air into the tire.

In accordance with another aspect, the pressure compensation chamber is in direct fluid communication with the tire cavity. In other words, the volume defined by the pressure compensation chamber is fluidly connected to the tire cavity without any further valves or obstacles. For example, the compressor may comprise one or more air passageways connecting the volume of the tire cavity with the volume of the pressure compensation chamber.

According to another aspect, the first membrane has a first side contacting the hydraulic fluid and a second side forming a deformable wall of the pressure compensation chamber. Thus, the first side may be in direct contact with the hydraulic fluid contained in the reservoir. Upon application of hydraulic fluid pressure or mechanical actuation or pneumatic actuation, the membrane may be pressed into the direction of the second membrane into the pressure compensation chamber. Further, due to the fact that one side of the first membrane is subject to tire cavity pressure via the pressure compensation chamber and the other side faces the hydraulic fluid, which is also subject to tire cavity pressure, the first membrane does not move the second membrane into a compression state in the absence of hydraulic fluid pressure as for instance generated by the rolling and deforming tire.

According to another aspect, the second membrane has a first side forming a deformable wall of the pressure compensation chamber and a second side forming a deformable wall of the compression chamber.

According to another aspect, the air inlet is in fluid communication with a check valve allowing air flow into the compression chamber but blocking air flow out of the compression chamber through the air inlet.

According to yet another aspect, the air outlet is in fluid communication with a check valve allowing air flow from the compression chamber to the air outlet but blocking air flow through the air outlet into the compression chamber.

According to yet another aspect, the compressor comprises a first body element comprising the hydraulic reservoir and a second body element comprising at least the compression chamber, wherein a circumferential portion of the first membrane is disposed as an annular seal between the first body element and the second body element.

According to yet another aspect, the compressor comprises a piston arranged in the compression chamber and actuatable by a deformation of the second membrane. Such a piston may be used to further increase the compression in the compression chamber.

According to yet another aspect, the compression chamber has a substantially hollow cylindrical shape having a sidewall, and wherein the piston may slide along the sidewall and has a compression surface for compressing air in the compression chamber and an opposite actuating surface contacting the second membrane. The compression surface and the actuating surface may extend essentially in parallel to the first membrane and the second membrane.

Moreover, the present invention is directed to a pneumatic tire comprising a compressor, wherein the compressor is mounted to a sidewall of the tire inside the tire's cavity. For example, the compressor may be glued or screwed to the sidewall.

In an aspect, the compressor further comprises a deformable reservoir for containing a hydraulic fluid, wherein the first membrane is in hydraulic fluid communication with the deformable reservoir such that upon actuation of the first membrane via hydraulic fluid pressure, the first membrane exerts a force on the second membrane and presses the second membrane into the air compression chamber.

In another aspect, the hydraulic reservoir is in contact with the tire's sidewall to periodically and reversibly deform upon a rolling motion of the tire.

In another aspect, the compressor has a rigid arm portion connected to the tire's sidewall. The rigid arm portion may provide an opposing force to the periodic deformation of the reservoir compressible by the periodic deformation of the tire's sidewall. The arm portion may for instance be glued or screwed to the tire and/or may be made of rubber, plastics or metal, as e.g. aluminum. The bag or reservoir may in general be made of rubber, plastics, silicone or any other flexible material.

All features of the above described aspects of the invention may be combined or replaced with one another.

DEFINITIONS

"Axial" and "axially" means lines or directions that are parallel to the axis of rotation of the tire.

"Bead" means that part of the tire comprising an annular tensile member commonly referred to as a "bead core" wrapped by ply cords and shaped, with or without other reinforcement elements such as flippers, chippers, apexes, toe guards and chafers, to fit the design rim.

"Belt structure" or "reinforcing belts" means at least two annular layers or plies of parallel cords, woven or unwoven, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Equatorial Plane" means the plane perpendicular to the tire's axis of rotation and passing through the center of the tread.

"Groove" means an elongated void area in a tire wall that may extend circumferentially or laterally about the tire wall. The "groove width" may be equal to its average width over its length.

"Radial" and "radially" means directions radially toward or away from the axis of rotation of the tire.

"Sidewall" means that portion of a tire between the tread and the bead.

"Tread" means a rubber component which when bonded to a tire carcass includes that portion of the tire that come into contact with the road when the tire is normally inflated and under normal load.

BRIEF DESCRIPTION OF THE DRAWINGS

In the following, we briefly describe the figures according to the embodiments of the present invention. Further details are given in the detailed description of the embodiments. The Figures have the purpose of illustrating the invention and should not be understood in a limiting sense.

FIG. 5 is a perspective cross sectional view of the air compressor shown in FIGS. 3 and 4 in a compression state;

FIG. 6 is a perspective view of an air compressor in accordance with another embodiment of the present invention;

DETAILED DESCRIPTION OF THE EMBODIMENTS

Figure 1:
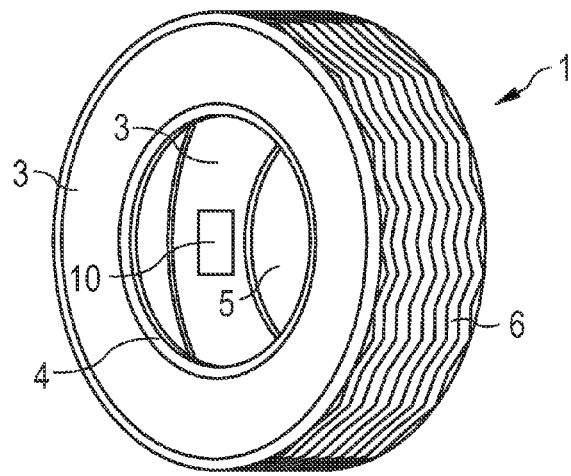
FIG. 1 is a perspective view of a tire in accordance with an embodiment of the invention.

Referring to FIG. 1, the present invention may be directed to a compressor 10 mountable to a sidewall 3 of a pneumatic tire 1 inside an annular cavity 5 of the tire 1, wherein the sidewall 3 extends between the tire's bead region 4 and the tire's tread region 6. The tire 1 may be any pneumatic tire as for instance an air plane, passenger car, off-the-road, or truck tire.

Figure 2:
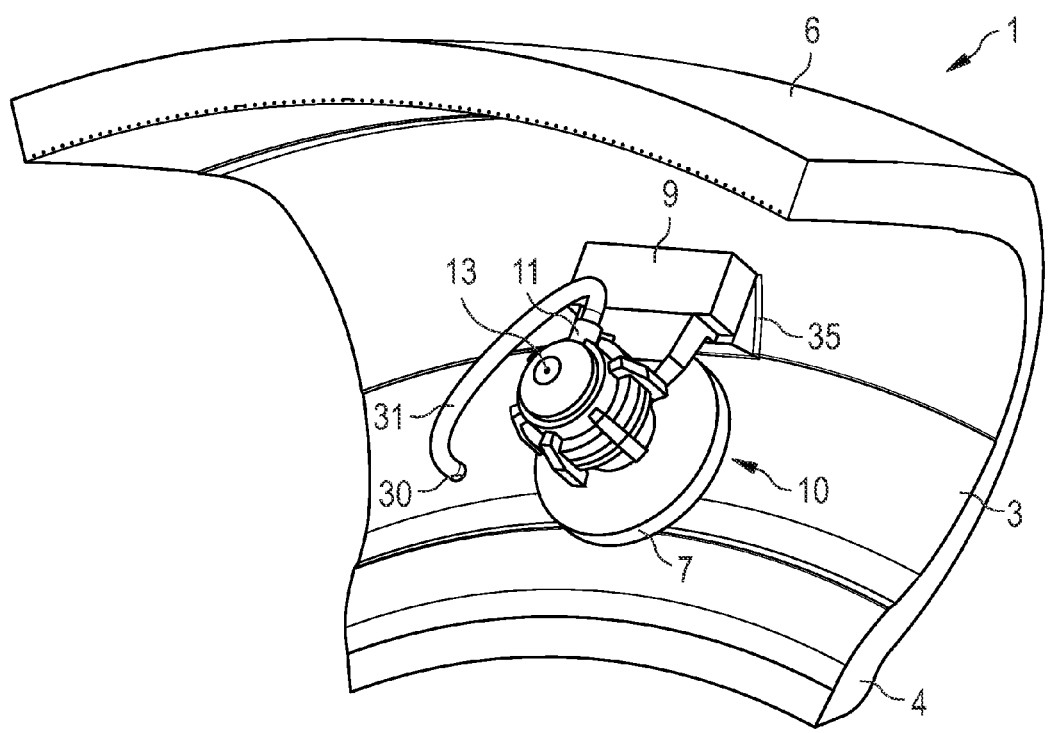
FIG. 2 is a partial perspective, cross sectional view of the tire according to FIG. 1.

FIG. 2 is a schematic partial cross section through the tire 1 according to FIG. 1, in which the compressor 10 is mounted to the tire's sidewall 3 inside the tire cavity. In the depicted embodiment, the compressor 10 is mounted to the sidewall 3 via a glued connection 35. Further, the compressor 10 may be fluidly connected with an air passage through the tire's sidewall 3. Such a connection may be established via a flexible tube 31 connected on one end to an air inlet 11 of the compressor 10 and on the other end to the connecting member 30 in fluid communication with the air channel or passageway (not shown) through the tire's sidewall 3. Thus, air may enter the compressor 10 via the channel extending through the tire's sidewall 3 into the tube 31 and via the inlet 11. The compressor 10 has an outlet 13 such that the compressor 10 may pump air received through the inlet 11 into the tire cavity. The compressor 10 may be actuated or energized by the periodic or cyclical deflection of the tire's sidewall 3 caused by the rotation of the rolling tire 1. In particular, the compressor 10 may comprise a flexible or deformable reservoir or bag 7 comprising a hydraulic fluid 8 such that upon reciprocal or reversible deformation of the reservoir 7, hydraulic fluid pressure may be generated within the reservoir 7. The hydraulic fluid 8 may be an incompressible fluid, as for instance water or oil. In particular, the compressor 10 may be attached to the sidewall 3 via a rigid arm or support 9 which may have a stiffness exceeding the stiffness of the reservoir 7 such that the arm 9 may provide an opposing force to the deformation of the reservoir 7.

Figure 3:
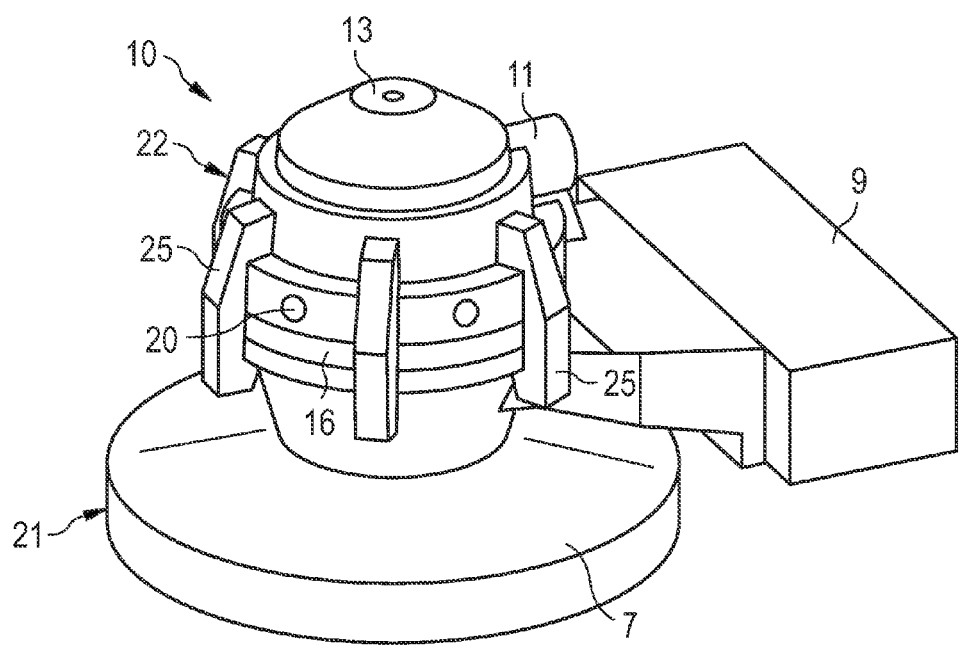
FIG. 3 is a perspective view of an air compressor in accordance with an embodiment of the present invention.
Figure 4:
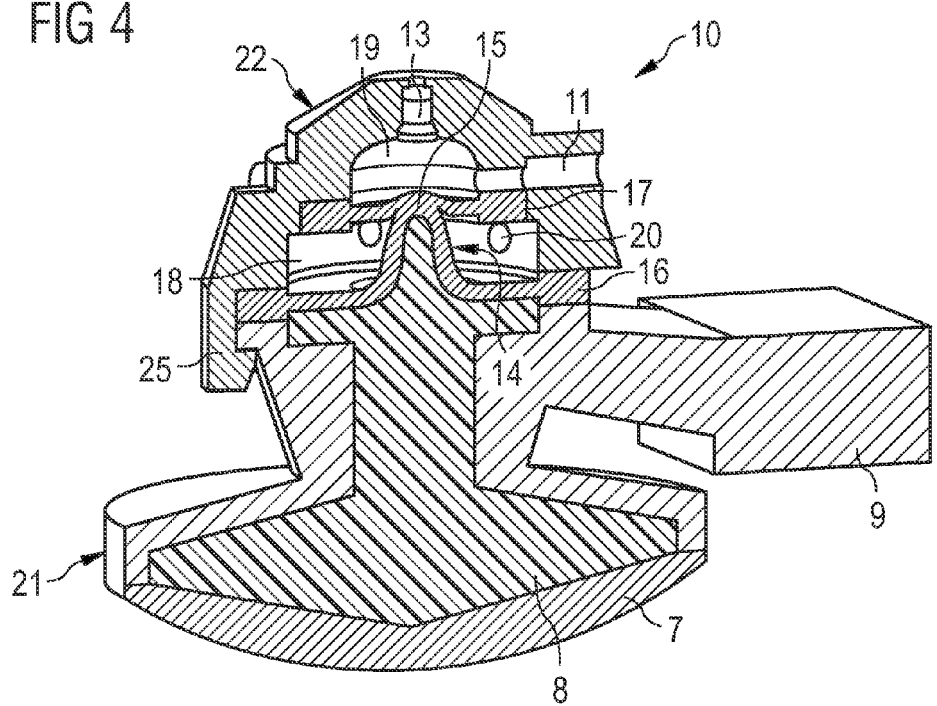
FIG. 4 is a perspective cross sectional view of the air compressor shown in FIG. 3 in an intake state.

FIGS. 3 to 5 show further details of the compressor 10 depicted in FIG. 2. As shown in the depicted perspective cross sectional view of FIG. 4, the compressor 10 comprises an air inlet 11 and an air outlet 13 which are in fluid communication with a compression chamber 19. The fluid inlet 11 comprises or is in fluid communication with a check valve (not shown) which allows air to enter the compression chamber 19 but blocks air flow back from the compression chamber 19 through the air inlet 11 out of the tire 1. Similarly, the outlet 13 may comprise or may be in fluid communication with a further check valve (not shown) which allows air to exit the compression chamber 19 via the air outlet 13 but blocks airflow through the air outlet 13 from the tire cavity 5 into the compression chamber 19.

Further, the compressor 10 comprises a double membrane 14 or, in other words, a double membrane assembly 14. The double membrane assembly 14 comprises a first membrane 16 and a second membrane 17 which are superposed with a distance. Both membranes 16, 17 may be connected with each other via a linking element 15. The linking element or portion 15 may be an integral part of the double membrane assembly 14 and/or may be provided in a central portion of both membranes 16, 17. Both membranes may have a rotational symmetry about an axis passing through and aligned with the linking element, wherein both membranes 16, 17 are arranged in parallel to each other and the linking element 15 extends perpendicularly to the planes defined by the membranes 16, 17. The first membrane 17 may comprise a (conical) bulge extending into the direction of the compression chamber 19, which may increase the function and/or stability of the double membrane 14. The bulge may be a portion of the linking element 15 and/or may be arranged in a central portion of the first membrane 16. In the decompressed state, the second membrane 17 may have a substantially flat surface facing the compression chamber 19.

A volume or chamber 18, which is mentioned herein as a pressure compensation chamber 18, is provided between the first membrane 16 and the second membrane 17. The pressure compensation chamber 18 is in fluid communication with the tire cavity 5 or with the environment of the compressor 10. Such a connection may be established via an aperture 20 in the pressure compensation chamber 18. The first membrane 16 and the second membrane 17 may form two walls of the pressure compensation chamber 18. Further, the first membrane 16 has a surface opposite to the surface in contact with the pressure compensation chamber 18, which is in contact with hydraulic fluid 8 enclosed by the hydraulic fluid reservoir 7.

A body of the compressor 10 may comprise multiple body elements 21, 22. For example, one body element 21 may comprise the flexible hydraulic fluid reservoir 7 for contacting a deflection zone of the tire's sidewall 3 and a lever arm 9 mountable to the tire's sidewall 3 for providing an opposing force to the reservoir's deformation. Further, the body may comprise a second body element 22 which may comprise the compression chamber 19, the air inlet 11, and/or the air outlet 13. Both body elements 21 and 22 may be connected to each other via connecting means as for instance by clamping means 25. However, a connection may also be provided by other means as for example via screwing, gluing, riveting, press-fitting, or welding. The first membrane 16 may have also the function of a sealing element sealing the fluid reservoir 7 and/or the connection between body elements 21 and 22. In general, each membrane 16, 17 may have an essentially planar shape with a circular circumference. Further, at least one of membranes 16, 17 may have an annular rim having a larger thickness than the membrane's portion enclosed by that rim. In particular, the annular rim of the first membrane 16 may be in direct contact with the first body element 21 and the second body element 22.

Referring to FIG. 4, the reservoir 7 is shown in a decompressed or relaxed state. Thus, the double membrane 14 is also in such a state, or in other words in an intake state, so that air may enter through the fluid inlet 11 into the compression chamber 19.

Referring to FIG. 5, the compressor 10 depicted in FIGS. 2 to 4 is shown in a compression state. A deformation or compression of the hydraulic fluid bag 7 presses the hydraulic fluid 8 against the first membrane 16, thereby deforming, stretching or extending the first membrane 16 into the pressure compensation chamber 18. In particular, the aforementioned conical bulge may be enlarged by hydraulic fluid pressure. This stretching of the first membrane 16 results in a stretching of the second membrane 17 bulging or extending into the compression chamber 19. Thus, the volume of the compression chamber 19 is decreased and air in the compression chamber 19 is compressed and forced out through the air outlet 13 into the tire cavity 5. When the fluid bag 7 returns to its decompressed state, the membrane 14 returns to its position depicted in FIG. 4.

When the compressor 10 is installed in the tire cavity 5, the hydraulic fluid bag 7, the side of the first membrane 16 facing the pressure compensation chamber 18, and the side of the second membrane 17 facing the pressure compensation chamber 18 are in direct fluid contact with the air in the tire cavity 5, or in other words, are subject to tire cavity pressure. On the one hand, this assures that the movement of the first membrane 16 is not impeded by tire cavity pressure. On the other hand, the second membrane 17 connected via the link 15 to the first membrane 16, is not urged by tire cavity pressure into the compression chamber 19, through deformations of the first membrane 16 and hydraulic bag 7. Thus, the second membrane 17 is kept in an intake state in the absence of hydraulic fluid pressure resulting from the deformation of the tire's sidewall when driving. Moreover, the described arrangement avoids the compression of the hydraulic bag 7 due to the tire cavity pressure.

The surface or diameter of the second membrane 17 may be smaller than the surface or diameter of the first membrane 16. This may further help to avoid an intrusion of the second membrane 17 into the compression chamber 19 due to tire cavity pressure at the intake state. In particular, the tire cavity pressure may usually be higher than the environmental pressure entering the compression chamber 19 at the intake state.

Although the above described embodiment comprises a deformable reservoir 7 for containing a hydraulic fluid, it is emphasized that this feature must not be considered as an essential element limiting the present invention. For example, the first membrane 16 might be actuated by hydraulic pressure generated at a remote location, as for instance by a hydraulic engine providing hydraulic fluid pressure via a duct to the first membrane. Alternatively, actuation might be generated mechanically by mechanical actuation of the first membrane by the deflecting sidewall 3 of the tire. In that case, a hydraulic fluid chamber might not be necessary.

Figure 7:
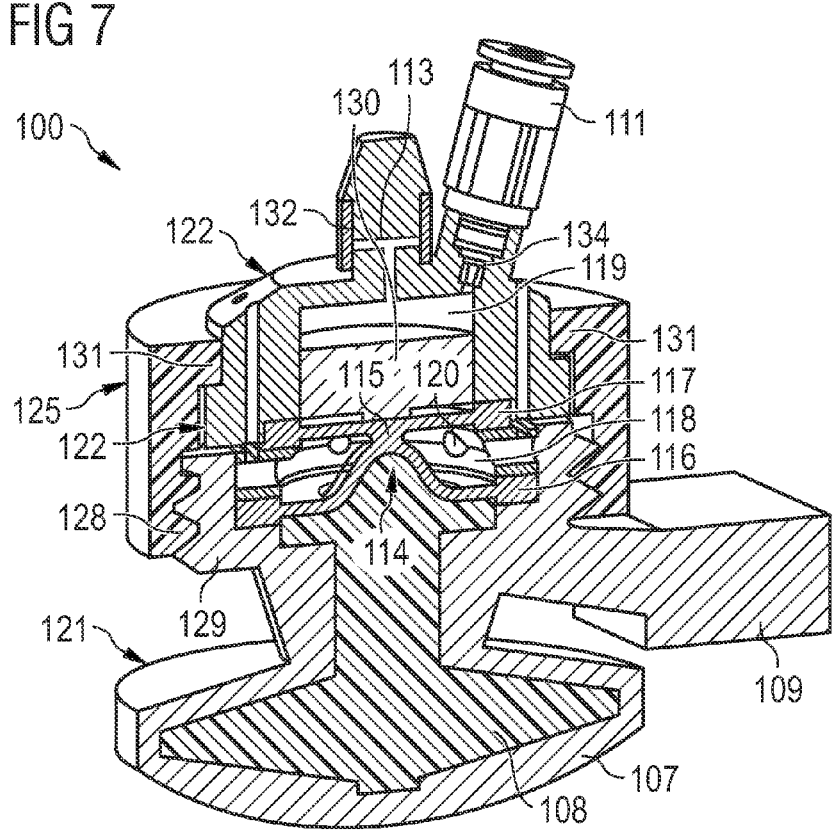
FIG. 7 is a perspective cross sectional view of the air compressor shown in FIG. 6.

FIGS. 6 and 7 show a compressor 100 in accordance with another embodiment of the present invention. Many components of that compressor 100 are similar to those described in the context of FIGS. 2 to 5.

Referring to FIG. 6, the depicted compressor 100 comprises an air inlet 111, an air outlet 113, a hydraulic fluid reservoir 107, comprising hydraulic fluid 108, a lever arm 109, a body portion 121, and further body portion 122 and a connecting element 125 connecting body portion 121 with body portion 122. The depicted air outlet 113 may comprise a sleeve valve or check valve 132 which avoids air entering the compressor 100 through the air outlet 113.

As further shown in the cross sectional view of FIG. 7, the general layout of the compressor 100 is similar to that described in the preceding embodiment. The compressor 100 shown in a decompressed or intake state comprises a double membrane assembly 114 having two membranes 116 and 117 connected via a linking element 115. Further, the compressor 100 comprises a pressure compensation chamber 118 and an air compression chamber 119. The pressure compensation chamber 118 is in fluid communication with the environment of the compressor 100 or with the tire cavity 5, respectively. Such communication may be provided via one or more channels or passageways 120.

The first body portion 121 and the second body portion 122 are preferably connected via a sleeve 125 comprising a threaded portion 128 for connection to a corresponding threaded portion 129 provided on the first body element 121. After screwing the sleeve 125 on the first body element 121, the second body element 122 is held within the sleeve 125 via a flange 131 of the sleeve 125.

In contrast to the embodiment of FIGS. 2 to 5, the embodiment according to FIGS. 6 and 7 comprises a piston 130 arranged in the compression chamber 119. The piston 130 is actuatable by the second membrane 117. In particular, the piston 130 may have a cylindrical shape with a cylindrical sidewall and a bottom in contact with the second membrane 117. The piston 130 may be connected to the second membrane 117, e.g. via a glued connection. Alternatively, or in addition, a spring (not shown) may be provided in the compression chamber 119 for forcing the piston into an intake position, i.e. towards the membrane 117. Upon actuation by the membrane 117, which stretches under hydraulic fluid pressure as already described with respect to the preceding FIGS. 2 to 5, the piston 130 compresses air in the compression chamber 119 and forces the air out of the outlet 113. The piston 130 may further reduce the volume of the compression chamber 119 compared to the volume of the chamber without such a piston 130. Thus, the compression of the compression chamber 119 is increased.

As also depicted in FIG. 7, the air inlet 111 comprises a check valve 134, in particular a duckbill valve 134, which avoids that air may exit the compression chamber 119 via the air inlet 111, especially during the compression state.

In other words, the piston 130 and/or the membranes 14, 16, 17, 114, 116, 117 reciprocate under periodic variation of hydraulic pressure of the hydraulic fluid 8, 108 in the reservoir 7, 107 when the tire rotates during driving.

In general, the linking element or portion 15, 115 may have a higher stiffness than the stiffness of the membranes 16, 17, 116, 117. The membranes 16, 17, 116, 117 and/or the linking element 15, 115 may for instance be made of or comprise plastics, rubber or silicone. The linking element 15, 115 may also be made of metal.

Figure 8:
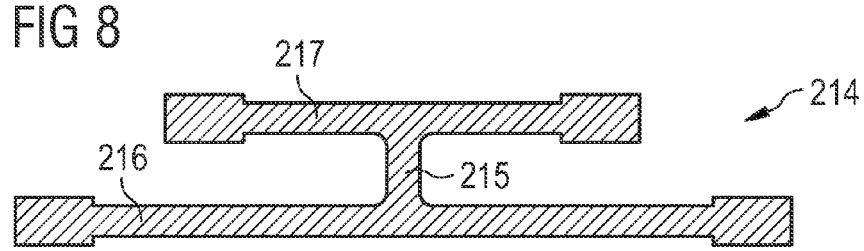
FIG. 8 is a cross sectional view of another example of a double membrane.

With reference to FIG. 8, showing another example of a double membrane assembly 214 which is usable in a compressor 10, 100 according to the present invention, has a linking portion 215 connecting a first membrane 216 with a second membrane 217. The linking portion 215 has essentially a rod-like shape extending perpendicularly between both membranes 216, 217. The rod-like portion 215 may be connected on each of its two ends by a rounded portion which may help to avoid a rupture of the linking portion 215. In FIG.

8, the membrane 214 is shown as a single piece member containing membranes 216, 217 and the linking portion 215. However, the linking portion 215 might be glued to at least one of the membranes 216, 217.

Figure 9:
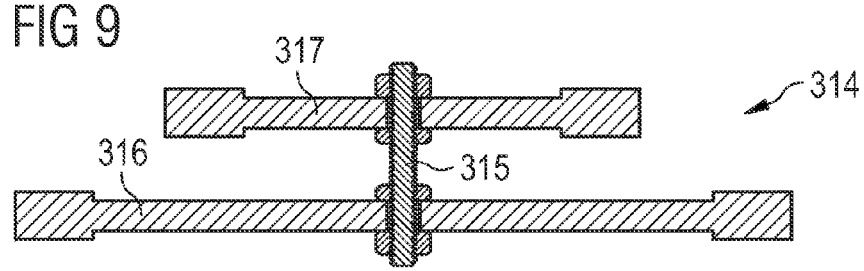
FIG. 9 is a cross sectional view of yet another example of a double membrane.

Referring to FIG. 9, a further embodiment of a double membrane 314 comprises a first membrane 316 and a second membrane 317 connected by a rod member 315. The rod member 315 may for example be made of plastics or metal, as e.g. aluminum, and may be connected to the membranes 316, 317 via nuts or rivets. The depicted rod member 315 extends through the membranes 316 and 317. However, alternatively at least one of the rod member's ends may be glued to a membrane 316, 317 or may otherwise be fixed to a membrane 316, 317 without piercing the latter.

The invention has been described with reference to best modes of carrying out the invention. Obviously, modifications and alterations will occur to others upon a reading and understanding of this specification. It is intended to include all such modifications and alterations in so far as they come within the scope of the appended claims or the equivalents thereof.

In any case, the above described embodiments shall not be understood in a limiting sense. In particular, the features of the above embodiments may also be replaced by or combined with one another.

The invention claimed is:

1. An air compressor mountable to a sidewall of an annular tire cavity, the compressor comprising:
    an air inlet for receiving air to be pumped into the tire cavity;
    an air outlet for releasing air into the tire cavity;
    a double membrane assembly having a first membrane and a second membrane arranged in parallel to the first membrane;
    a pressure compensation chamber provided between the first membrane and the second membrane, the pressure compensation chamber being in fluid communication with the tire cavity; and
    an air compression chamber arranged on a side of the second membrane opposite to the pressure compensation chamber, the air compression chamber being in fluid communication with the air inlet and the air outlet.

2. The air compressor according to claim 1, wherein the first membrane has a first central portion and the second membrane has a second central portion, and wherein the first central portion is attached to the second central portion.

3. The air compressor according to claim 2, wherein the first membrane is attached to the second membrane by a linking element, the linking element extending essentially perpendicularly to the first membrane and the second membrane through the pressure compensation chamber.

4. The air compressor according to claim 3, wherein the first membrane, the second membrane and the linking element are formed as a single piece member.

5. The air compressor according to claim 4, wherein the double membrane assembly comprises at least one of rubber and silicone.

6. The air compressor according to claim 1, wherein at least one of the first membrane or the second membrane have an annular rim and wherein the second membrane is arranged in a spaced relationship above the first membrane.

7. The air compressor according to claim 1, wherein the first membrane and the second membrane define two walls of the pressure compensation chamber.

8. The air compressor according to claim 1, wherein, upon actuation of the first membrane, the first membrane is configured to exert a force on the second membrane and press the second membrane into the compression chamber.

9. The air compressor according to claim 1, wherein the pressure compensation chamber is in direct fluid communication with the tire cavity.

10. The air compressor according to claim 1, wherein the compressor comprises a reversibly deformable reservoir for containing a hydraulic fluid and wherein the first membrane is in hydraulic fluid communication with the reservoir such that upon actuation of the first membrane via hydraulic fluid pressure, the first membrane exerts a force on the second membrane and presses the second membrane into the air compression chamber.

11. The air compressor according to claim 10, wherein the first membrane has a first side contacting the hydraulic fluid contained in the reservoir, and a second side forming a reversibly deformable wall of the pressure compensation chamber.

12. The air compressor according to claim 10, wherein the second membrane has a first side forming a reversibly deformable wall of the pressure compensation chamber and the side of the second membrane opposite the pressure compensation chamber forming a reversibly deformable wall of the air compression chamber.

13. The air compressor according to claim 10, wherein the first membrane has a first side contacting the hydraulic fluid and a second side forming a deformable wall of the pressure compensation chamber and wherein the second membrane has a first side forming a deformable wall of the pressure compensation chamber and the side of the second membrane opposite the pressure compensation chamber forming a deformable wall of the compression chamber.

14. The air compressor according to claim 10, wherein the air compressor comprises a first body element comprising the hydraulic reservoir and a second body element comprising at least the air compression chamber, and wherein a circumferential portion of the first membrane is disposed as a seal between the first body element and the second body element.

15. The air compressor according to claim 1, wherein the air inlet is in fluid communication with a check valve allowing air flow into the air compression chamber but blocking air flow out of the compression chamber.

16. The air compressor according to claim 1, wherein the air outlet is in fluid communication with a check valve allowing air flow from the air compression chamber to the air outlet but blocking air flow through the air outlet into the air compression chamber.

17. The air compressor according to claim 1, further comprising a piston arranged in the compression chamber and actuatable by a deformation of the second membrane.

18. The air compressor according to claim 17, wherein the air compression chamber has a substantially hollow cylindrical shape having a sidewall, and wherein the piston slides along the sidewall and has a compression surface for compressing air in the air compression chamber and an opposite actuating surface contacting the second membrane.

19. A pneumatic tire comprising a compressor according to claim 1, wherein the compressor is mounted to a sidewall of the tire inside the tire's cavity.

20. The tire according to claim 19, further comprising a deformable reservoir for containing a hydraulic fluid, wherein the first membrane is in hydraulic fluid communication with the deformable reservoir such that upon actuation of the first membrane via hydraulic fluid pressure, the first membrane exerts a force on the second membrane and presses the second membrane into the air compression chamber, and wherein the hydraulic reservoir is in contact with the tire's sidewall to periodically deform upon a rolling motion of the tire.

21. The tire according to claim 20, wherein the compressor has a rigid lever arm connected to the sidewall for providing an opposing force to the deformation of the reservoir upon compression of the reservoir by a deformation of the sidewall when the tire is rolling.

\* \* \* \* \*